(No Model.)  2 Sheets—Sheet 1.
J. CRAIG.
CULTIVATOR.
No. 464,011. Patented Dec. 1, 1891.
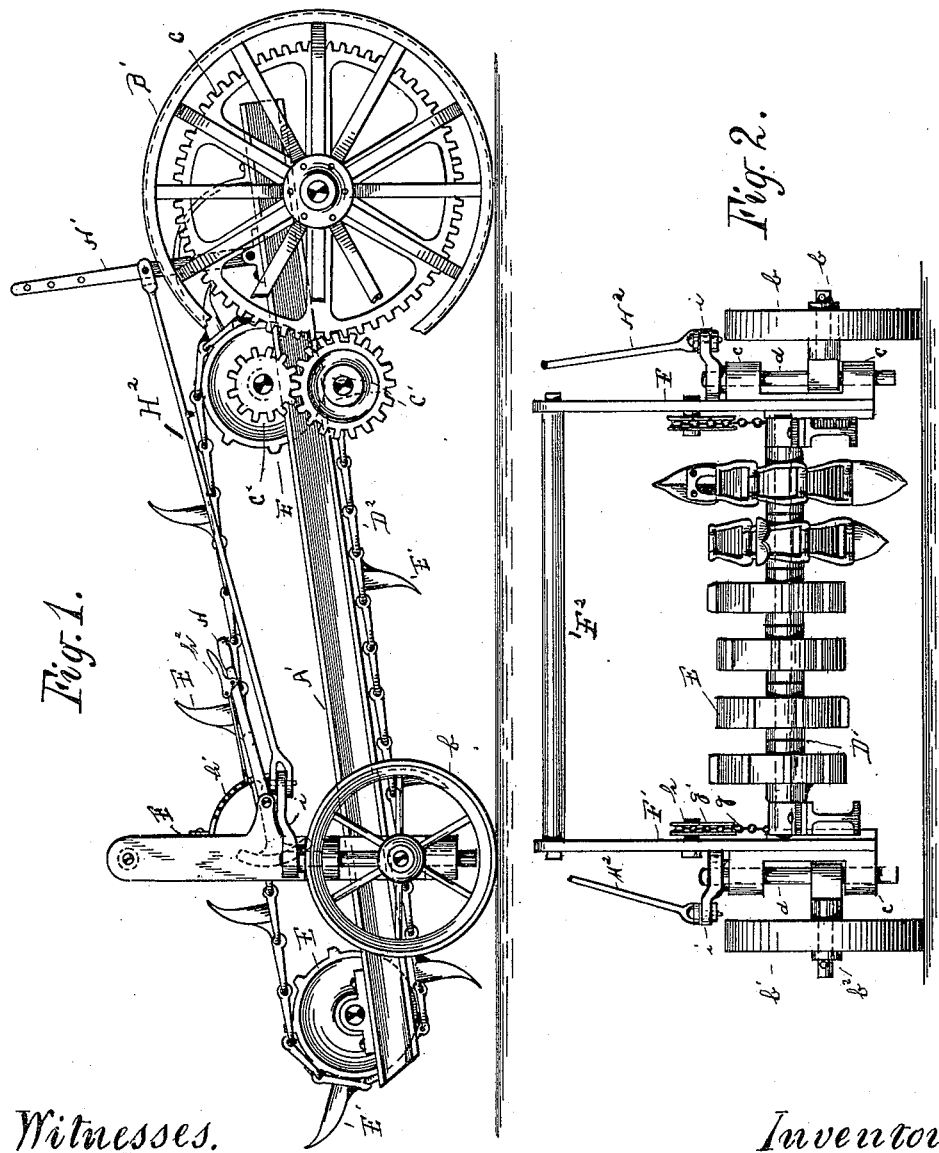

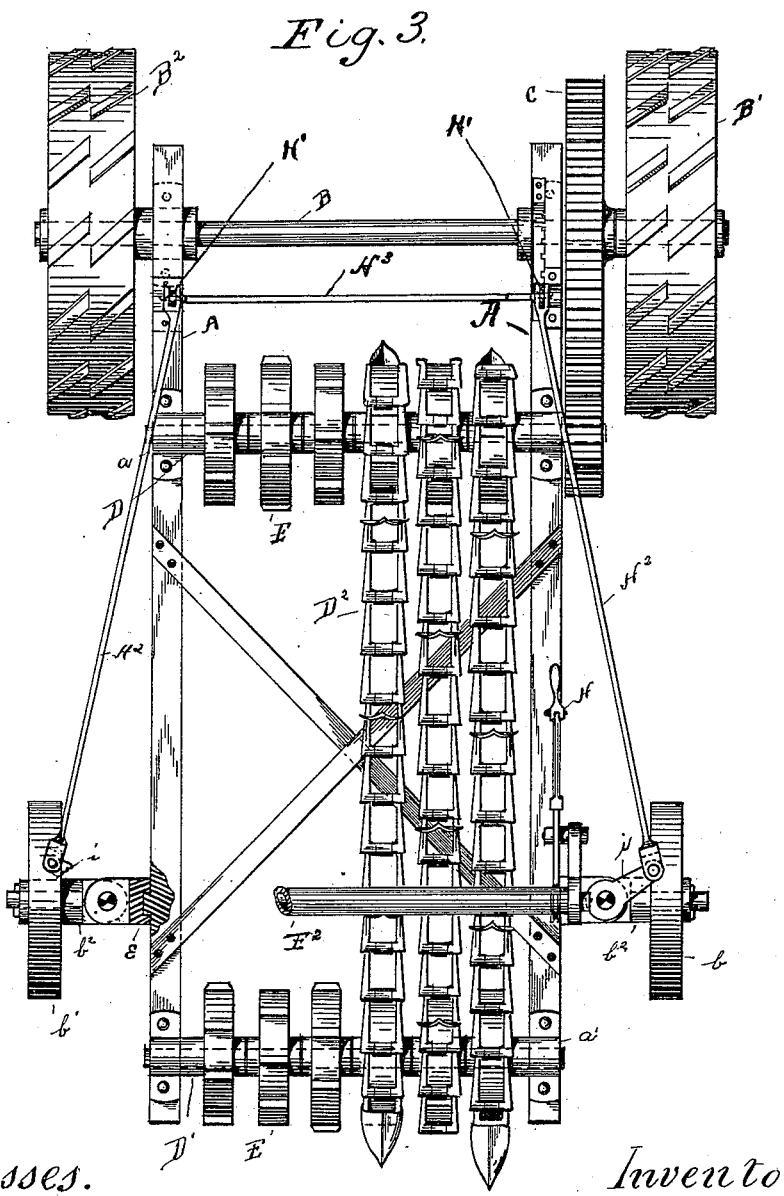

UNITED STATES PATENT OFFICE.

JOSEPH CRAIG, OF WOODLAND, CALIFORNIA.

CULTIVATOR.

SPECIFICATION forming part of Letters Patent No. 464,011, dated December 1, 1891.

Application filed October 1, 1890. Serial No. 366,715. (No model.)

*To all whom it may concern:*

Be it known that I, JOSEPH CRAIG, a citizen of the United States, residing at Woodland, in the county of Yolo and State of California, have invented certain new and useful Improvements in Cultivators; and I do hereby declare the following to be a full, clear, and exact description of said invention, such as will enable others skilled in the art to which it most nearly appertains to make, use, and practice the same.

My invention has relation to certain new and useful improvements in cultivators, harrows, plows, or the like, which consists of the arrangement of parts and details of construction, as will be hereinafter more fully shown by the drawings, and described and pointed out in the specification.

The object of my invention consists in providing a cultivator, plow, or the like adapted to be used in connection with a traction-engine or otherwise, having a series of forwardly-moving endless chains provided with cutting-teeth adapted to travel under and above the movable frame thereof in direction corresponding with the movement of the plow.

My invention further consists in providing a plow, cultivator, or the like carrying endless traveling chain or chains provided with cutting-teeth, wherein the frame thereof shall be pivotally secured at its forward end and adjustably secured between the rear rollers, and with mechanism for raising or lowering the same, so as to increase or decrease the inclination thereof and regulate the depth of the traveling cutting-teeth.

Referring to the drawings forming a part of this application, wherein similar letters of reference are used to denote corresponding parts throughout the entire specification and several views of the drawings, Figure 1 is a side view in elevation; Fig. 2, a rear view in elevation, and Fig. 3 a top plan view partly broken away.

The letter A is used to indicate the frame of the machine pivotally secured to the shaft B, which has secured to its outer ends the drive-wheels $B'$ $B^2$. Upon said axle I locate the gear-wheel C, which is adapted to revolve in unison with drive wheels and shaft. Said gear meshes with gear-wheel $C'$, which in turn engages gear $C^2$.

To the front and rear of the frame I mount within suitable bearings $a$ $a'$ shafts D D', which are provided with a series of sprocket-wheels E, which may be formed integral therewith or independent thereof. The gear $C^2$ is rigidly secured to end of shaft D, so that motion transmitted from gear $C'$ will cause the rotation thereof and travel of endless chains (over the sprocket-wheels) which have removably attached thereto the blades or teeth $E'$. By making the same removable I am enabled to insert others in case of breakage resulting thereto. With the forward travel of the machine the shafts D D' are caused to rotate through the medium of the gear connection C C' $C^2$, and carry with the movement thereof the endless traveling belt or chain $D^2$, which engages with the sprocket-wheels thereof. The rotation of the shafts and travel of the chains carry the cutting blades or teeth over and beneath the movable frame, thereby bringing the same into contact with the ground, and inasmuch as the frame is suspended at an incline it is obvious that the cut of the blade will in depth equal the inclination thereof. The blades are revolved forwardly as the endles traveling chains move in direction according to the travel of the entire machine, (in view of the fact that the rotating axles of said movable frame form two centers for the moving chains.)

Walking of the pivoted frame is obviated by contact of the teeth or blades with the ground and at the same time a greater cutting force is given thereto.

The rear wheels $b$ $b'$ are considerably less in diameter than the drive-wheels and are secured to short axles $b^2$, which are rigidly attached to the vertical rods $d$, which are held in projecting ears $c$. Said ears extend outward from the standards F F', which I secure together by means of cross-bar $F^2$. The inner face of said standards have the vertical channel or guideways formed therein, within which the outer projecting shoulder E of the frame is adapted to vertically move. Said frame is suspended between the vertical standards F F' by means of the chains $g$, which are attached to wheels $g'$ working upon projections $h$ extending from the standards. Said wheels are operated by any suitable mechanism for raising or lowering the pivoted frame—as, for instance, through the medium of the hand-lever H, which is provided with the spring-catch $h^2$, which engages with the segment $h'$. (Fully shown in Fig. 1.) By pivoting the entire frame to the forward or drive-shaft and allowing the same to freely hang between the rear wheels I am enabled through the medium of suitable mechanism (such as above described) to raise or lower the same so as to adjust the inclination thereof, thereby regulating the depth of the cut.

Any number of sprocket-wheels may be secured upon the axles D D′ for the reception of the endless chains which correspond therewith.

In order to change the line of travel of the machine, I provide hand-levers H′, which are pivoted at their lower ends to the sides of the frame, and also pivoted at or near their center to connecting-rods $H^2$, which latter are united by means of a cross-bar $H^3$ and have their rear ends secured to short arms $i\ i$, projecting from the vertical rods $d\ d$. It will thus be seen that by a forward or backward movement being given to levers H′, I am enabled through the connecting mechanism to cause the rotation of the rods $d\ d$, which latter cause the turning of the wheels $b\ b'$, and consequently change the line of travel of the entire machine.

The machine herein described is designed more especially for use in connection with traction-engines, and may be attached thereto in any suitable manner; but if so desired, however, the same may be employed as an ordinary plow by the providing of suitable means for permitting attachment of horses.

I am aware that minor changes may be made in the arrangement of parts and details of construction herein shown and described without creating or necessitating a departure from the nature and scope of my invention.

Having thus described my invention, what I claim as new, and desire to secure protection in by Letters Patent of the United States, is—

1. The improved cultivator combining the rearwardly-inclined and adjustable frame carrying the shafts, each provided with series of sprocket-wheels encompassed by series of endless belts carrying series of cultivator-teeth, substantially as set forth.

2. In a cultivator or plow, the combination, with the frame carrying the endless belt of cultivator teeth or plows, of the connected standards having the ears forming bearings for rods carrying rear-wheel axles, substantially as set forth.

3. In a cultivator or plow, the combination, with the frame carrying the endless belt of cultivator teeth or plows, of the connected standards having a sliding connection with said frame, and ears forming bearings for rods carrying the rear-wheel axles, substantially as set forth.

4. In a cultivator or plow, the combination, with the frame carrying the endless belt of cultivator teeth or plows and having at its sides projections or shoulders, of the connected standards having guideways receiving said projections or shoulders, and ears forming bearings for rods carrying the rear-wheel axles, substantially as set forth.

5. In a cultivator or plow, the combination, with the frame carrying the endless belt of cultivator teeth or plows, of the connected standards having a sliding connection with said frame, and ears forming bearings for the rods carrying the rear-wheel axles, said frame being suspended by chains connected to segmental levers pivoted to and having a ratchet-and-pawl connection with said standards, substantially as set forth.

6. In a gang-plow, the combination of rear vertical standards provided with outwardly-extending ears, vertical rods turning in said ears, roller-axles secured to the lower ends of the rods, outwardly-extending arms secured to upper ends thereof, connecting-rods secured to the outwardly-extending arms, a cross-bar for uniting said connecting-rods, and operating-levers pivoted at their lower ends to the sides of the machine and at or near their center to the connecting-rods, substantially as set forth.

In testimony whereof I affix my signature in presence of two witnesses.

JOSEPH CRAIG.

Witnesses:
JAMES O. MAXWELL,
NICHOLAS A. HAWKINS.